US009438695B2

(12) United States Patent
Schach et al.

(10) Patent No.: US 9,438,695 B2
(45) Date of Patent: Sep. 6, 2016

(54) PROCESS AND APPARATUS FOR EXECUTING WORKFLOW SCRIPTS

(71) Applicant: ServiceTrace e.K., Darmstadt (DE)

(72) Inventors: Justus Schach, Worms (DE); Markus Duus, Darmstadt (DE)

(73) Assignee: ServiceTrace e.K., Darmstadt (DE)

( * ) Notice: Subject to any disclaimer, the term of this patent is extended or adjusted under 35 U.S.C. 154(b) by 548 days.

(21) Appl. No.: 13/847,733

(22) Filed: Mar. 20, 2013

(65) Prior Publication Data
US 2013/0297678 A1 Nov. 7, 2013

(30) Foreign Application Priority Data

Mar. 21, 2012 (EP) ..................................... 12160552

(51) Int. Cl.
*G06F 3/048* (2013.01)
*G06F 21/00* (2013.01)
(Continued)

(52) U.S. Cl.
CPC ................ *H04L 67/42* (2013.01); *G06F 9/54* (2013.01); *G06F 11/3688* (2013.01); *G06F 11/30* (2013.01); *G06F 17/30867* (2013.01); *G06F 21/10* (2013.01); *G06F 21/50* (2013.01); *G06F 21/60* (2013.01); *H04L 67/22* (2013.01)

(58) Field of Classification Search
CPC .................... H04L 12/5692; H04L 29/06836; H04L 9/3226; H04L 9/3234; H04M 1/10; H04M 1/18; H04M 1/23; H04M 3/08–3/14; G06Q 50/12–50/16
USPC ................................................. 709/203, 207
See application file for complete search history.

(56) References Cited

U.S. PATENT DOCUMENTS 7,035,912 B2 * 4/2006 Arteaga .................. G06F 9/542
                                                                709/203
8,392,497 B2 * 3/2013 Vilke ........................ G06F 9/54
                                                                709/202
(Continued)

FOREIGN PATENT DOCUMENTS

EP          2189908         5/2010

OTHER PUBLICATIONS

Muljadi Buidman, "Connect VMWare virtual machines using Remote Desktop", Friday Nov. 13, 2009, Geekswithblogs.net "http://geekswithblogs.net/NewThingsILearned/archive/2009/11/13/connect-to-vmware-virtual-machines-using-remote-desktop.aspx".*

*Primary Examiner* — Patrice Winder
*Assistant Examiner* — Abderrahmen Chouat
(74) *Attorney, Agent, or Firm* — Volpe and Koenig, P.C.

(57) ABSTRACT

In order to improve the safety against unauthorized access and spying in a method and a respective computer program product for the script-controlled execution of at least one application on a computer, using the help of a software robot, which controls a graphic user interface (28, 28a, 28b) by applying pattern recognition, it is provided to install on the computer a terminal server and, preferably by a first program component (18, 18a, 18b), to start a terminal client, which establishes via a remote control protocol a remote connection to the terminal server. Here, the terminal client provides the graphic user interface (28, 28a, 28b) for the software robot. Within a session (24, 24a, 24b) allocated to the terminal client then a second program component (22, 22a, 22b) is started, which calls the software robot and implements a script (26, 26a, 26b) to execute at least one application.

13 Claims, 2 Drawing Sheets

(51) Int. Cl.

| | | |
|---|---|---|
| *G06F 3/0484* | (2013.01) | |
| *G06F 9/44* | (2006.01) | |
| *G06F 3/0481* | (2013.01) | |
| *H04L 29/06* | (2006.01) | |
| *G06F 9/54* | (2006.01) | |
| *G06F 11/36* | (2006.01) | |
| *G06F 17/30* | (2006.01) | |
| *H04L 29/08* | (2006.01) | |
| *G06F 21/10* | (2013.01) | |
| *G06F 11/30* | (2006.01) | |
| *G06F 21/60* | (2013.01) | |
| *G06F 21/50* | (2013.01) | |

(56) References Cited

U.S. PATENT DOCUMENTS

| | | | |
|---|---|---|---|
| 2001/0034847 A1* | 10/2001 | Gaul, Jr. | H04L 63/1433 726/25 |
| 2002/0026495 A1* | 2/2002 | Arteaga | 709/217 |
| 2006/0004667 A1 | 1/2006 | Neil | |
| 2006/0085562 A1* | 4/2006 | Blaho | H04L 67/38 709/247 |
| 2009/0103769 A1 | 4/2009 | Milov et al. | |
| 2010/0115467 A1 | 5/2010 | Duus | |
| 2014/0325531 A1* | 10/2014 | Harm | G06F 9/4843 719/320 |

\* cited by examiner

PROCESS AND APPARATUS FOR EXECUTING WORKFLOW SCRIPTS

BACKGROUND

The invention relates to a method and a respective computer program—product for a script-controlled execution of applications on a computer using a software robot, which controls a graphic user interface by using pattern recognition, as well as a respective computer system.

Such a method, computer program—product, and computer system are described in EP2189908A1.

Due to the fact that an operating system, such as Microsoft Windows, in the blocked conditions (screen locked) does not allow that GUI-actions may occur, such as mouse movements and keyboard entries, as is the case in the objective of the above-mentioned patent application, in order to execute a script and/or to address a graphic user interface (GUI) by means of a software robot a user must be logged-on. This leads to the consequence that on the one hand physical computer manipulations are possible at any time and that on the other hand data can be obtained by spying. Based on the fact that additionally processes are monitored in the End2End—monitoring which are critical for the business, the user implemented for the workflow may be given far-reaching access rights, and additionally the data displayed should not be visible for everybody.

Present solutions provide that such monitoring computers are operated in a separate room provided for that very purpose.

Summarizing, the prior art shows the following disadvantages:
  A user must be logged on at all times
  Data may be obtained by spying when a monitor is connected
  Control can be assumed when a mouse and/or keyboard is connected
  The computer must be provided in a room not accessible for unauthorized personnel
  In case of a decentralized control station a trustworthy person must be available on site, among other things for booting up the computer, in order for a user to get logged on, if applicable, or for maintenance work.

One option to address the above-stated problems is the use of virtual machines (VM). Here, essentially only the problem of the location is solved. It must be observed by the administrator that all users (admins) with access to the consoles of the VMs also have access to and control over the virtual computer. Particularly in larger companies it cannot be assumed that every person present in the data processing center shall be provided with access, here. In case of computers located in business areas or field offices the virtualization is entirely unsuitable. However, particularly here End2End—monitoring is overwhelmingly used, with in this case it relating to physical computers on site.

SUMMARY

The present invention, in the following also called "MultiTracer", allows however, in a further development of the European patent application EP2189908A1 a coveted execution of workflow scripts related to Windows GUI (graphical user interface), particularly, without limitation, to monitor the quality of IT-systems on the application level. In this regard the above-mentioned application is referenced herein in its entirety. The workflow scripts mentioned are here generally equivalent to those monitoring functions and/or work processes which are executed in the earlier application by the software robot mentioned there. Thus, the invention is not generally limited to Windows systems.

In order to achieve the advantages described in the following and to avoid the above-mentioned safety-relevant disadvantages of prior art in the method of the type mentioned at the outset, a terminal server is installed on the computer and/or appropriately provided. On the computer preferably a terminal client is started by a first program component, which via a remote control protocol establishes a remote connection to the terminal server. Here, the terminal client provides the graphic user interface for the software robot. Within the scope of a session allocated to the terminal client then a second program component is started, which addresses the software robot and implements a script to execute at least one application.

The respective computer program product according to the invention comprises program commands which are stored or can be saved on a data carrier, with upon their implementation on a suitable computer architecture the execution of the method according to the invention occurs, with the program commands programmatically defining particularly the first program component and the second program component.

A computer system for a script-controlled embodiment of applications provides a process environment, which includes the hardware of a computer, an operating system installed on said computer, as well as preferably at least one additionally installed software platform. The operating system comprises a graphic user interface. The computer system additionally includes a software robot, which is embodied by way of program technology such that in a script-controlled implementation the graphic user interface is addressed by applying pattern recognition and thus to execute at least one application on the computer. Additionally the computer system comprises a terminal server, a terminal client, as well as a first and a second program component. The first program component is programmed to start the terminal client and to configure it such that it establishes via a remote control—protocol a remote connection to the terminal server. The terminal client provides the graphic user interface for the software robot. The first program component is additionally programmed to start the second program component within the scope of a session allocated to the terminal client. The second program component in turn is programmatically devised to address the software robot and to implement a script for executing the at least one application.

Advantageous embodiments are discernible from the dependent claims.

In order to avoid the above-mentioned disadvantages the present invention therefore suggests to utilize the remote desktop protocol (RDP) or a similar remote control protocol, for example in case operating systems other than Windows are used. When using such a remote control protocol the desktop of a remote computer can be controlled by a computer. The client required here is the so-called terminal client. Due to the fact that simultaneous connections are possible, here a session is discussed for each user logged on. Normally a user can directly work with this client. In addition to a remote connection, primarily in the Microsoft Windows Server variants, the computer itself can also be accessed. Within the scope of the present invention this client technology is used to implement such a connection to the computer itself, which is to be monitored.

Due to the fact that RDP is not disclosed by Microsoft, within the scope of a preferred embodiment of the invention an ActiveX-control is used, which is available for free from Microsoft. Using this Active-X control it is possible to open a RDP-connection, with it here not being necessary that the connected GUI is visible.

Here, particularly the following advantages develop:

A user can be logged on without the corresponding session being visible. In particular the monitor is not visible, and it is impossible to control input devices, such as keyboard or mouse.

The user account can be managed by the controlling framework of the MultiTracer, and only the administrator managing the corresponding workflow scripts needs to be aware of it.

Several RDP-connections may be open simultaneously on a single Windows

Server system. This way, several workflows may operate parallel on a computer (physically or virtually). This operation is called the MultiSession mode of the MultiTracer in the present case.

By the central administration and the flexible type of forming sessions by the ActiveX-control system parameters can be freely selected, such as resolution, color depth, and system language of the terminal session.

This approach is not directly applicable for pure client variants, such as Windows XP and Windows 7. Although it is possible here too to address the desktop from a remote computer, however the computer cannot access itself. This is caused in blocking this functionality purely based on effective licenses.

Thus, a further development was created for the MultiTracer in the SingleSession mode, which according to the invention provides that a small Linux core (or a core based on another operating system) is run on the client system. Here, the MultiTracer system communicates with this (Linux)-core and thus initiates an X-server application RDESKTOP or the like. Due to the fact that Windows treats the Linux core and/or the other operating system as an external computer now a RDP-session can be started on the Windows computer.

In another further development, instead of a Linux core, an alternative RDP-based terminal server is installed in order to allow generating local RDP-connections. The terminal server represents a separate software component, which can be installed like any other software on the computer. Preferably this terminal server exclusively offers the option to locally establish an RDP-connection, however it prohibits simultaneously establishing an additional connection from another computer.

In a respective further development of the invention a central control component acts as a software agent, which is called MultiTracer agent, preferably implemented as a Windows Service. This software agent administers the workflow scripts, which shall be executed by a software robot within the session opened by the terminal client. Here, the agent ensures that the scripts are obtained in their correct version from the respective file or repository and controls the execution of the workflow defined in the scripts according to the scheduling specifications of a superior control center.

For this purpose it preferably starts a first software component, called StSem, which establishes and monitors a respective session via remote control protocols. Specifications for the terminal client started by the first software component are for example a user account and a monitor resolution. Within the terminal session the first software component initiates a second software component, called StSec or StSec.exe, which then performs the actual execution and control of the workflow scripts and directly communicates with the software agent. The component StSec.exe in turn is integrated in the Windows session, which is started for each user. This is required because the workflow shall proceed within this session and must be started by a program which is already included in said session.

When the software agent is implemented as a Windows Service, it is initiated by the Windows-internal Session Control Manager (SCM). Due to the fact that the process StSem or StSem.exe in turn is started by the software agent it is included in a desktop, which is present but not visible, and provided by the SCM for Windows services. This way, StSem represents the (actually) visible user interface, from which StSec is covertly initiated and controlled via RDP. In spite thereof a user without at least local administrator rights is not able to access the respective windows of StSem, because they are located on a covert desktop of the SCM.

The invention allows monitoring of a software system in its entirety, with a software installation to be monitored or reviewed particularly comprising a client and a server part. In this case, the client can be operated by means of software robots, in order to monitor the software system. Advantageously here as many client instances as possible can be accessed on the respective server in order to perform load tests. These clients can here be controlled in respectively separate terminal session via software robots, with their terminal sessions being physically executed on and by the very same computer via MultiTracer as the one housing the terminal server. Additionally it is possible via software agents to start terminal session—clients on physically remote computers.

BRIEF DESCRIPTION OF THE DRAWINGS

Additional features and advantageous of the present invention are discernible from the following description of exemplary embodiments based on the drawing.

DETAILED DESCRIPTION OF THE PREFERRED EMBODIMENTS

Figure 1:
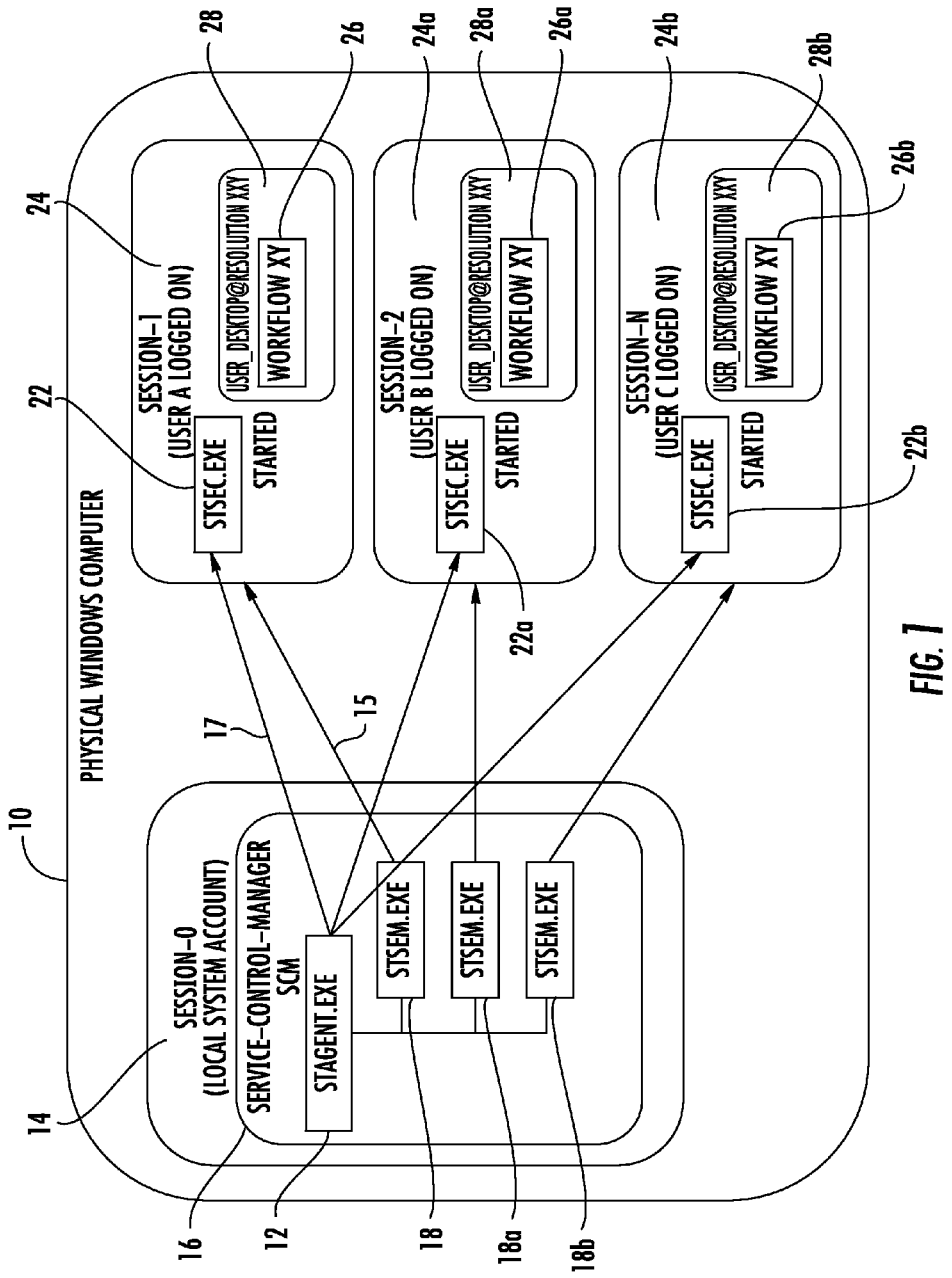
FIG. 1 shows the technically programmed design of a MultiTracer session within the processing environment of a computer.

The present invention is based on the use of a network protocol by which the desktop of a remote computer can be illustrated and controlled. Such a remote control protocol is e.g., the proprietary Remote Desktop Protocol RDP of Microsoft, which is used in the present exemplary embodiment.

When a RDP-based remote control connection is established between two computer systems one of the two systems acts as a terminal server, the other one as the terminal client. The terminal server generates monitor displays on the terminal client. Additionally, mouse and keyboard entries can be received from the terminal client. Here, RDP controls the transmission of the monitor content as well as keyboard and mouse entries via the network. In addition to monitor displays as well as keyboard and mouse entries via RDP the audio output of the session can also be rerouted to the terminal client. Additionally, the use of a printer and the access to storage media of the terminal client are possible.

RDP is based on a TCP/IP connection and establishes a protocol of the application layer. RDP-based terminal servers are components of nearly all Windows operating systems, and thus they are already installed on most computers.

Of course, alternatively it can also be installed on a separate terminal server independent from a Windows installation. This is particularly advantageous in Windows versions XP and 7, because hereby the license-related blocking of internal terminal sessions is overcome. Terminal clients, such as the program mstsc.exe, are also found in most operating systems and are provided with the operating system.

Within the scope of the software component model ActiveX of Microsoft a number of ActiveX-control elements (so-called controls) are available for using RDP. Due to the fact that ActiveX is based on the Component Object Model (COM) of Microsoft the control elements can easily be integrated in other programming languages, such as Java, Basic, or C++.

As mentioned above, the present invention is based on the method for executing GUI-related workflow scripts described in detail in the European patent application EP2189908A1, which is hereby referenced in its entirety.

The solution described there, allows the performance of testing and measuring processes on the application level of a computer system, in order to test and measure for example the operation readiness or performance of the computer system or its applications.

In order to abstain from interfering with the applications to be monitored the operation occurs via the graphic user interface in the very same manner as any human user would observe and operate it. This is done via a software robot, which via (particularly contour-dependent) detection of patterns can recognize predetermined conditions and select and operate graphic operating elements via mouse or keyboard inputs. For additional details reference is made to EP2189908A1.

As described above, RDP is normally used to control the desktop of a remote computer. In the present case, RDP is used however to generate a desktop inside a computer, particularly independent from the user log-on and not visible from the outside and protected from external manipulation, which the software robot can access and on which it particularly can execute the above-mentioned testing and measuring processes.

The workflows to be executed by the software robot are defined by a program unit, not described in greater detail, which is called the control center and is composed in the form of one or more scripts. Additionally, time schedules can be predetermined by the control center, stating when respective workflows shall be executed. In the execution of the scripts by a script interpreter the above-mentioned software robot can be used to operate the graphic user interface.

In the exemplary embodiment the execution of the workflows themselves is managed by a cooperation of three program components. FIG. 1 shows a logical allocation of the program components within the workflow environment 10 of a computer. The workflow environment 10 comprises the hardware of the computer, its operating system, here for example a Windows operating system, as well as perhaps additionally installed software platforms, for example a .NET framework, an ActiveX software component model, or a Java Runtime Environment (JRE). The computer itself is a commercial computer, which therefore needs no detailed description, here. The hardware shows the common design and comprises for example one or more processors, an operating memory unit, a graphics unit (e.g., graphics card and monitor), a network connection (e.g., one or more network cards), as well as periphery devices, such as hard drives, printers, keyboards, mouse, etc., which are connected via one or more bus systems.

A software agent 12 is installed on the computer, which in the present case is also called MultiTracer agent. A computer program is usually called a software agent when it is capable of exhibiting a certain independent and auto-dynamic (autonomous) behavior. Depending on the various conditions a software agent can execute pre-determined processing routines without another start signal is given from the outside or without any external control measures being required during the process. For this purpose the MultiTracer agent 12 is preferably implemented as a Windows System server.

A Windows system server represents a program running as a specialized service in the background of Windows. In a Unix operating system this system server is equivalent to a so-called daemon. This way it is possible, independent from any user log-on, to start and execute planned processes from the background.

The MultiTracer agent 12 normally uses the local system account 14. The local system account 14 is the account predefined in Windows which has complete access to the computer. It is exclusively used for system services and has no password accessible by any user. Additionally Windows provides the Service Control Manager (SCM) 16, which administers the start and stop of services. During the start of the system the MultiTracer agent 12 is started by SCM 16 in the local system account 14 and thus represents the initial session (in FIG. 1 marked "session 0"), from which the execution of the workflow scripts is initiated. Programs started by a Windows system service are included in a desktop, which is present by covert, provided by SCM. Due to the fact that they are included in the covert desktop of the SCM the respective windows cannot be accessed by a user, at least not without far-reaching authorization.

Of course, the MultiTracer 12 can also run on a different account if said account is provided with sufficient authorization, or it can be manually activated by a user.

The other two program components, in addition to the MultiTracer agent (StAgent) 12, are the programs StSem and/or StSem.exe 18 and StSec or StSec.exe 22.

The component StSem 18 is the session manager. Here, session represents the terminal session, which is opened in order to then allow executing the script. StSem 18 has the purpose, by addressing a terminal client (e.g., mstsc.exe) via a RDP-connection 15, to generate a terminal session 24 and here to start the program component StSec 22.

The program component StSec 22 is the session controller and is parameterized during the establishment of the RDP-connection by the StSem 18 and started within the newly generated Windows terminal session 24. Due to the fact that StSec 22 is therefore within the session 24, it is capable of starting processes here, such as an AutoIt interpreter, and thus also the above-mentioned workflow scripts, which are shown symbolically at the reference character 26. The StSec 22 accepts respective commands from StAgent 12 and executes them. Inversely, the StSec 22 constantly returns status information of the executed script 26 of the StAgent 12.

The above-mentioned AutoIt is a software to generate macros in a BASIC-similar script language, by which processes can be automated within Microsoft Windows. Of course, arbitrary other script interpreters and languages can also be used.

Additionally, the MultiTracer, as shown in FIG. 1, is preferably designed such that several parallel terminal sessions are executed on a computer. For this purpose, for each planned terminal session 24, 24a, 24b the StAgent 12 addresses a separate StSem process 18, 18a, 18b. Each of the StSem processes 18, 18a, 18b starts a separate terminal session 24, 24a, 24b and here activates a StSec process 22, 22a, 22b. The individual terminal sessions 24, 24a, 24b can here be started with different users and corresponding passwords. A separate graphic user interface 28, 28a, 28b in the form of a desktop is allocated to each of the terminal sessions 24, 24a, 24b, on which a script 26, 26a, 26b can be executed with the use of the respective software robot. The graphic resolution of each desktop can be determined as the starting parameter when the session is initiated.

Input for a session is only possible via a graphic user interface 28, 28a, 28b allocated to said session 24, 24a, 24b. When the respective desktop 28, 28a, 28b is executed covertly, thus not displayed, no input by the user is possible in the corresponding session, and graphic output cannot be reviewed by any external user. In such a covert session data input is only possible by the software robot started by the StSec process 22, 22a, 22b already included in the session, which can also review the graphic output of the session on a covert desktop 28, 28a, 28b and can process it via (contour-dependent) pattern recognition. This way a high degree of safety is achieved with regards to unauthorized access and spying.

Another advantage results when StSec.exe is started instead of and as a replacement for a Windows-shell and thus replaces Windows Explorer. The task bar with its start menu and also the icons on the desktop are generated and administered by the initial instance of the Windows Explorer or the like. In accordance with systems oriented in command bars this is called a Windows shell.

With MultiTracer it is possible to start Windows Explorer dependent on configuration. This occurs by a switch when addressing the components StSem. In addition to the elimination of interfering influences, such as e.g., various Windows popup messages, the utilization of the primary memory can be reduced by omitting Windows Explorer. Due to the fact that it is possible operate in parallel several 100 sessions on a computer here considerable resources can be saved.

In general, the StSem 18 is addressed by the already-mentioned agent StAgent 12 in order to start a session 24. Here, the agent 12 specifies the user, the resolution, and the color depth of the desired session 24. Using this information StSem 18 opens an internally displayed terminal session 24 for the host stated. In the exemplary embodiment, without limitation here, this is always the local computer (local host).

The RDP protocol allows here to predetermine a program for the new Windows session 24, which shall be started. In the present case this is the component StSec22, which within this session 24 assumes the control over the workflow scripts 26 to be started. For this purpose StSec 22 is provided with control commands from the agent 12. This preferably occurs via .NET remoting, thus the agent 12 forwards a port via the StSem 18 to the StSec 22, which then waits for agent commands to arrive at this port.

StSem 18 now monitors that StSec 22 is continuously executed by also communicating preferably via .NET-remoting with StSec 22. The agent 12 however issues its commands directly to StSec 22, e.g., "start workflow XY" 26.

Microsoft .NET remoting is a framework allowing objects to communicate with each other. The framework includes a number of services, e.g., activation and object life span, as well as communication channels responsible for the transportation of messages to and from remote applications. The communication can here occur via network protocols, such as a TCP-connection or a HTTP-connection. In the exemplary embodiment the processes StAgent 12 and StSec 22 communicate with each other via an internal TCP-connection 17 under the port address listed.

A potential expansion comprises to establish, in addition to an internal terminal session, additional terminal sessions to other computers, for example within a network domain, so that processes can be tested and monitored over several computers from end to end (End2End).

The Preferred Process in an Overview:
  StAgent 12 starts the StSem 18. As starting parameters the following configuration parameters are specified: user/password, resolution, color depth, TCP-PORT,
  StSem 18 starts a RDP-session 24 to the local terminal-server of the computer (local host),
  Here, StSem 18 instructs the session 24 to start the program StSec 22,
  StSec 22 starts the new session 24 and waits for commands from StAgent 12,
  StSem 18 monitors StSec 22,
  In the session 24 StSec 22 starts the workflow scripts 26 and/or the software robot for executing tests and measurements, as described.

In the following, the components StSem and StSec are described in their respectively preferred embodiment.

StSem Command Line Parameters:
stsem.exe -port portnumber -user name -password password [-host hostname] [-r<width>x<height>] [-c colordepth] [-shell]
-port port \t start StSec.exe tcp/lp listener on this port.
-user user\t The user name
-password password\t The user password.
Optional:
-host hostname\t Use <hostname> instead of localhost for tcp connections.
-r resolution\t The internal used screen resolution. (e.g.: 800×600) default is: 1024*7868
-c colordepth\t (current version uses always 15/16 bit!)
-shell\t\t If set, current windows shell will be also started.
-local\t\t If higher security is required, this parameter will restrict the TCP connection to only local connections.
-ssm\t\t Enable single session mode.
-fs\t\t Enable support for font smoothing.
Switch Details:
  -port <number>
  Hereby the port is specified by which the .NET remoting communication shall occur. The StSem forwards this port to the StSec, which then represents the actual end point (listener). StSem only uses the port for communicating with StSec.
  -user <name>
  The user name as listed in the Windows user administration. In the event of a domain the domain name must be stated in front of it: <domaine>\user_name
  -password <name>
  The password as recorded for the user name stated in the Windows user administration.
  The password is not forwarded in plain text, but in an internally coded form.
  If for test purposes a plain text password shall be used the optional switch—clearpw shall be stated.
  -host <name> (optional, default: localhost)
  Without any statement here the local computer is assumed to be the target computer. If a remote computer shall be reached it can be listed accordingly.
  -r <number>x<number> (optional, default: 1024×768)

Here, an arbitrary resolution can be adjusted for the Windows session to be generated.

-c <number> (optional, default: 15 bit)

If a color depth is desired other than the default 15 bit, this can be set here.

Limitation: presently actually only 15 bit is supported by the RDP-server. All other settings are ignored. This may change in the future, thus this adjustment option is already provided.

-shell (optional, default: without shell)

If the shell is not provided, resources can be saved and disturbing interferences, such as warning popup-windows, are eliminated.

When the Windows shell is mandatory it can be explicitly activated via this switch.

-local (optional, default: open TCP/IP communication)

If this switch is activated, only TCP/IP connections of the same machine are accepted. It is therefore possible to prevent attempts of an 'aggressor' to access internal programs from the outside via respective interfaces.

-ssm (optional)

In preparation of the SingleSession mode of the MultiTracer the StSem can be switched into this mode. In this case, a Windows session is not generated directly via a RDP connection to be established but via an embedded OS (operating system; presently a Linux without restriction thereto) it is ensured that the session is opened from here.

-fs (optional)

When a switch is activated the font smoothing effects (if they were activated for the user listed) are also forwarded to the terminal client.

[-clearpw] (optional)

Normally passwords are encoded by an algorithm specific for the

ServiceTrace and only accepted in this form as a -password parameter. Now, if for test purposes a plain text password shall be used, this switch can be activated.

StSec Command Line Parameter

Usage:

stsec.exe -port portnumber [-local] [-shell]

-port portnumber Start Tcp/Ip listener on this port

-local If set, the StSec will only accept local connections.

-shell Start an explorer shell instance.

-hide Hide the console window.

Switch Details:

-local

Without this statement, connections from other computers are accepted as well. If -local is stated, it can be mandated that the network connections may only occur within the machine. This increases safety that no 'aggressor' from outside can access the interface.

-shell

The explorer is the shell (OS-user interface) of the Windows operating system. It here provides functions, such as toolbar, start menu, of also the icons on the desktop. Frequently, in a GUI based test run these 'features' can be waived. When -shell is not listed, the newly started Windows session is not provided with a shell and thus not with a desktop in the usual form, either. Due to the fact that the existing programs are started directly and then operated via a robot (an appropriate software application), the presence of a shell is not necessary.

Additional advantages for operating without the default shell are:

Saves relatively large amount of resources in the MultiTracer environment

No interfering message windows can appear because they are displayed by the shell (e.g., Windows Explorer).

-hide

Should be generally listed in order for console windows connected to the

StSec to be hidden. For debugging purposes it may be displayed, however then it can influence the measuring process.

Figure 2:
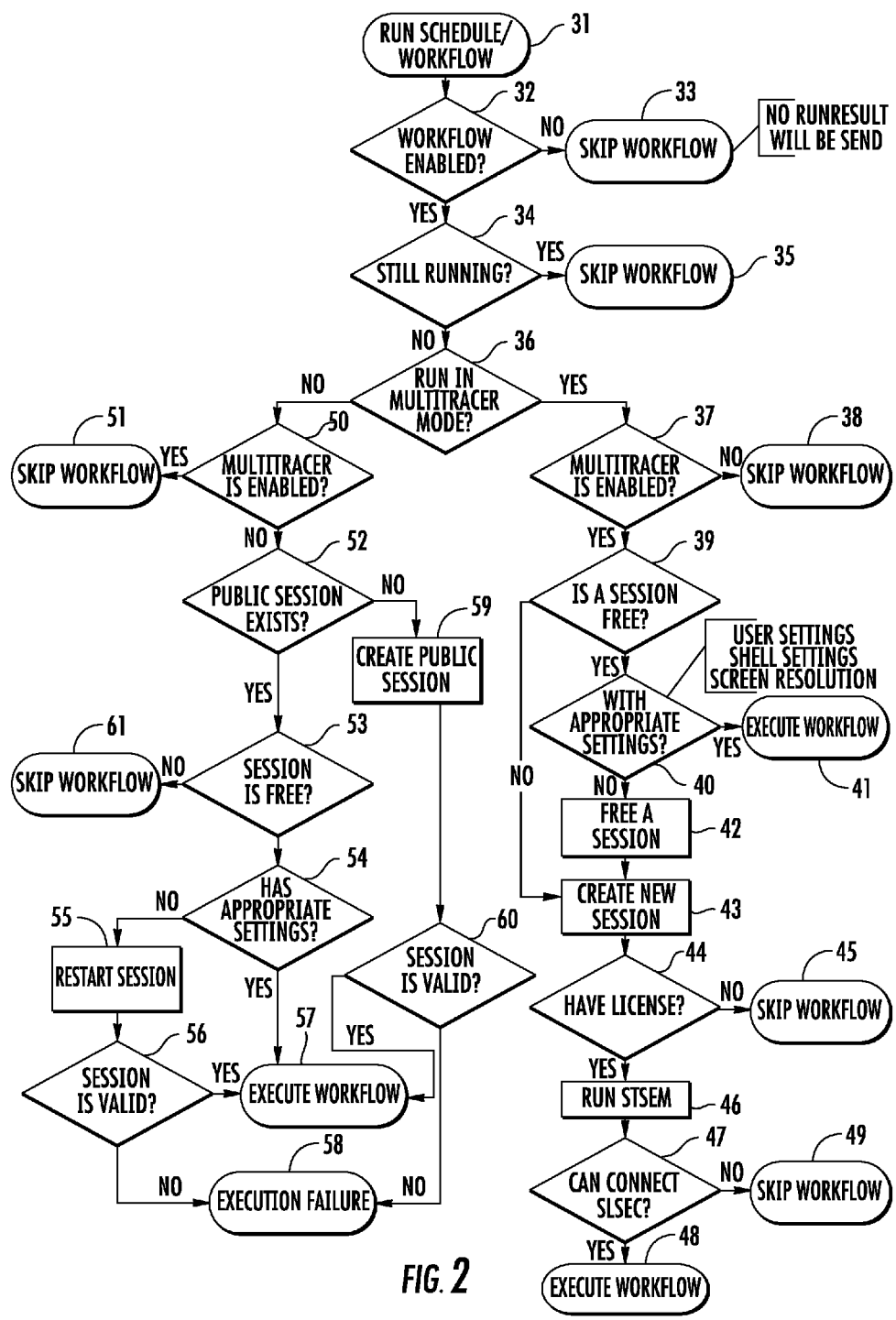
FIG. 2 shows a processing diagram of a MultiTracer session.

When a workflow is planned in the Multitracer mode the agent then generates for this workflow, based on its scheduling data, a so-called job. This job is forwarded to a scheduler integrated in the agent, which ensures the temporal control of the execution of the planned workflow. When a job is triggered by the scheduler preferably the processes shown in the attached FIG. 2 are executed. However, it shall be pointed out that the individual steps not necessarily have to be executed in the sequence shown.

Initially, it is determined via an instruction for implementation 31, triggered by the scheduler, to execute a planned workflow. Then it is checked in step 32 if the workflow to be executed has actually been activated and was released by the MultiTracer control center. If this is not the case, the workflow is skipped and in step 33 a respective error message is returned and/or entered in the log file, e.g., the message "workflow not enabled". However, if the test is positive, it is first determined in step 34 if the workflow is already in progress. If this is the case another starting of the job is prevented and the process is concluded with step 35.

If the job is not yet being processed a test 36 occurs if the job shall be started in the multi-session or in the single-session mode. The differentiation occurs, as already explained, by a start parameter (-ssm) when StSem is started. If the switch is set for single-session mode, the left branch is processed, otherwise the right branch. In the following it is first assumed that the multi-session mode shall be executed (right branch).

For this purpose it is checked in step 37 if the MultiTracer agent (StAgent) is activated, implemented in the system service running in the background. If the StAgent is deactivated the job is cancelled and in step 38 a respective error message is returned, e.g., "MultiTracer Service disabled". When StAgent is active, it is checked in step 39 if a free terminal-session is given, in which a StSem process is already running. In this case, it only must be determined in step 40 if the terminal-session shows the correct settings, as defined by the start parameters of StSem, among other things, if the settings for the user account to be used and the monitor resolution are correct and if the Windows shell shall or shall not be started. If all settings are correct, the workflow in the given session can be executed as planned in step 41.

If not all required settings are correct, the existing, free session is released in step 42, thus cancelled, and in step 43 a new terminal session is started with the requested settings. Additionally, in step 43 a new session is opened when in step 39 it is determined that no free session exits.

Now, another inquiry 44 occurs, if a valid license has been provided. For example, a license may be temporarily limited, or the license may be limited to certain number of simultaneously permitted sessions. If no valid license has been provided, the process is cancelled and in step 45 a corresponding error message is returned, e.g., "No valid license available", or "Number of allowed sessions exceeded".

If a valid license is given, the StSem process is started in step 46. When StSem is running, it must be checked in step 47 if StAgent can communicate with StSem via the predetermined port address. If the internal network connection is given between StAgent and StSem, the execution of the workflow can be started in step 48. Otherwise, the job is cancelled in step 49 with an error message, e.g., "Connection failed".

If the MultiTracer was started in the single-session mode, based on the test step 36 the left branch is processed. For this purpose, it must be determined in a step 50, similar to the test step 37, if the MultiTracer system server is active. If that is not the case, the execution ends with the issue of a respective error message in step 51.

If the system service is active, in step 52 it is checked if a public session is active. If this is the case, it is checked in step 53 if the session is free, thus if access is permitted, here. If the session cannot be accessed, the process ends in step 61 with a respective error message, e.g., "Insufficient privileges" or "Access failed". If the session is accessible, it is determined in the next test step 54 if the session shows the required settings. This step in turn is equivalent to step 40 in case of the multi-session mode. If the settings are in compliance with the settings selected by the start parameters, the execution of the workflow script is started in step 57.

A public session is understood as the execution of the workflow directly occurring on a just opened desktop. Due to the fact that the desktop is already provided for the execution, here, said execution of the workflow can be performed even without the establishment of a RDP connection. The single-session mode therefore represents a formerly common but unsafe processing manner, which however in the exemplary embodiment for reasons of compatibility is still supported, preferably for users not wanting to install additional software, such as a TS-expansion on their client operating system.

If the test step 54 results that the public session fails to show the correct settings, the session is initially started anew in step 55, i.e. the user logged on is logged off, and a new session is started with the predetermined settings. As described above, the starting of the session occurs here preferably from an embedded core of the operating system, e.g., a small Linux core, which is recognized by the computer as an external computer.

It is then determined in step 56 if a valid session could be started with the selected settings. If this is the case, the execution of the workflow script is started in step 57. Otherwise the progression ends in step 58 with a respective error message, e.g., "Execution failed".

When in a test step 52 no public session was found, in step 59 a public session is opened. This occurs in turn, similar to step 55, preferably by using an embedded core in the operating system. When a test 60 shows that a valid session could be generated with the desired settings, the execution of the workflow script is started in step 57, otherwise again the respective error message is issued in step 58.

The exemplary embodiments described only serve to explain in an exemplary fashion the concepts and contributions according to the invention in a manner understandable for the technically versed reader. The technically versed reader is hereby enabled to implement the invention in a manner described or modified. Finally it shall be mentioned that the described features, as well as equivalent modifications, can be combined in various fashions in order to achieve the advantages according to the invention mentioned at the outset.

The invention claimed is:

1. A method for a script-controlled execution of at least one application on a computer using a software robot, which controls a graphic user interface (28, 28*a*, 28*b*) by applying pattern detection, the method comprising: installing a terminal server on the computer,
starting a first program component (18, 18*a*, 18*b*) in an initial session (14) not allocated to the terminal client,
starting a terminal client on the computer which establishes via a remote control protocol a remote connection to the terminal server, with the terminal client providing the graphic user interface (28, 28*a*, 28*b*) for the software robot,
within a session (24, 24*a*, 24*b*) allocated to the terminal client, starting a second program component (22, 22*a*, 22*b*), which calls the software robot and executes a script (26, 26*a*, 26*b*) for execution of the at least one application,
wherein the first program component (18, 18*a*, 18*b*) starts the terminal client and instructs the session (24, 24*a*, 24*b*) allocated to the terminal client to start the second program component (22, 22*a*, 22*b*).

2. A method according to claim 1, wherein a software agent (12) runs on the computer, which starts the first program component (18, 18*a*, 18*b*) and controls via a network protocol the second program component (22, 22*a*, 22*b*).

3. A method according to claim 2, further comprising the first program component (18, 18*a*, 18*b*) assigns the second program component (22, 22*a*, 22*b*) during its start, a communication port, via which the software agent (12) communicates with the second program component (22, 27*a*, 22*b*).

4. A method according to claim 3, further comprising the software agent (12) instructing the second program component (22, 22*a*, 22*b*) via one or more control commands to execute the script (26, 26*a*, 26*b*) and the second program component (22, 22*a*, 22*b*) returning to the software agent status information regarding the script (26, 26*a*, 26*b*) executed.

5. A method according to claim 1, further comprising the first program component monitoring that the second program component (22, 22*a*, 22*b*) is continuously executed.

6. A method according to claim 1, wherein the terminal client is executed covertly and the graphic user interface (28, 28*a*, 28*b*) provided by the terminal client is not displayed on a display unit of the computer.

7. A method according to claim 1, wherein the second program component (22, 22*a*, 22*b*) is started within the session (24, 24*a*, 24*b*) allocated to the terminal client as a replacement for an operating system—shell.

8. A method according to claim 1, wherein the session (24, 24*a*, 24*b*) allocated to the terminal client is called from an embedded operating system core.

9. A computer program product in the form of program commands saved on a fixed, non-transitory data carrier, configured such that during execution of the program on a computer the method according to claim 1 is performed, with and the program commands programmatically defining the first program component (18, 18*a*, 18*b*) and the second program component (22, 22*a*, 22*b*).

10. A computer program product according to claim 9, further comprising the program commands programmatically defining a software agent (12), which is programmed when executed on the computer to start the first program component (18, 18*a*, 18*b*) and via a network protocol to control the second program component (22, 22*a*, 22*b*).

11. A computer program product according to claim 9, further comprising program commands programmatically defining the terminal server, independent from the installation of an operating system, which is programmed during the execution on the computer to cooperate with the terminal client, also executed on the computer, via a remote control protocol in order to implement a terminal session.

12. A computer system providing a processing environment (10), comprising a computer, an operating system installed on the computer, as well as at least one additionally installed software platform, with the operating system comprising a graphic user interface (28, 28a, 28b) and with the computer system comprising a software robot, which is configured in case of a script-controlled execution to address the graphic user interface (28, 28a, 28b) by applying pattern recognition and thus to execute at least one application on the computer, a terminal server, a terminal client, as well as first (18, 18a, 18b) and second (22, 22a, 22b) program components, the software platform being configured to start the first program component (18, 18a, 18b) in an initial session (14) not allocated to the terminal client, the first program component (18, 18a, 18b) being configured to start the terminal client such that via a remote control protocol the first program components establishes a remote connection to the terminal server, and the terminal client providing the graphic user interface (28, 28a, 28b) for the software robot, and the first program component (18, 18a, 18b) additionally being configured to start the second program component (22, 22a, 22b) within a session (24, 24a, 24b) allocated to the terminal client, and the second program component (22, 22a, 22b) being configured to call the software robot and to execute a script (26, 26a, 26b) to execute at least one application.

13. A computer system according to claim 12, further comprising a software agent, which is configured when implemented on the computer to start the first program component (18, 18a, 18b) and to control via a network protocol the second program component (22, 22a, 22b).

* * * * *